US 7,767,359 B2

(12) United States Patent
Hoffjann et al.

(10) Patent No.: US 7,767,359 B2
(45) Date of Patent: *Aug. 3, 2010

(54) DEVICE FOR PRODUCING WATER ON BOARD OF AN AIRPLANE

(75) Inventors: Claus Hoffjann, Neu Wulmstorf (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1438 days.

This patent is subject to a terminal disclaimer.

(21) Appl. No.: 10/532,545

(22) PCT Filed: Oct. 21, 2003

(86) PCT No.: PCT/DE03/03477

§ 371 (c)(1),
(2), (4) Date: Apr. 22, 2005

(87) PCT Pub. No.: WO2004/040680

PCT Pub. Date: May 13, 2004

(65) Prior Publication Data
US 2005/0266287 A1   Dec. 1, 2005

(30) Foreign Application Priority Data
Oct. 24, 2002   (DE) ................. 102 49 588

(51) Int. Cl.
H01M 8/04   (2006.01)
H01M 8/12   (2006.01)
B64D 11/02  (2006.01)
F02C 6/04   (2006.01)

(52) U.S. Cl. ............. 429/513; 429/440; 429/478; 429/495; 60/645; 60/670

(58) Field of Classification Search ............. None
See application file for complete search history.

(56) References Cited

U.S. PATENT DOCUMENTS 1,803,156 A   4/1931   Wagner (Continued)

FOREIGN PATENT DOCUMENTS

DE   43 02 319   11/1993

(Continued)

OTHER PUBLICATIONS

English computerized translation of JP 11-200888 published on Jul. 27, 1999, by Japanese Patent Office.

(Continued)

Primary Examiner—John S Maples
(74) Attorney, Agent, or Firm—W. F Fasse; W. G. Fasse

(57) ABSTRACT

A device for producing water on board an aircraft includes at least one high temperature fuel cell entirely or partially integrated into a combustion chamber arrangement of a gas turbine aircraft engine. The combination of at least one fuel cell and a gas turbine engine is adapted to operate exclusively with hydrogen and atmospheric oxygen, and is embodied in an aircraft propulsion engine and/or an auxiliary power unit used for producing compressed air for a cabin and a power supply of the aircraft. The at least one high temperature fuel cell is fed with pure hydrogen on an anode side and with air on a cathode side. The combustion chambers of the turbine engine are fed with an air-hydrogen mixture, whereby at least the hydrogen supply can be regulated or completely shut off.

22 Claims, 1 Drawing Sheet

U.S. PATENT DOCUMENTS

| | | | |
|---|---|---|---|
| 3,615,839 | A | 10/1971 | Thompson et al. |
| 3,773,574 | A | 11/1973 | Bridgforth et al. |
| 3,851,702 | A | 12/1974 | Heller et al. |
| 3,908,362 | A | 9/1975 | Szydlowski |
| 4,333,992 | A | 6/1982 | Healy |
| 4,871,452 | A | 10/1989 | Kohler et al. |
| 5,005,787 | A | 4/1991 | Cullingford |
| 5,443,733 | A | 8/1995 | Mueller et al. |
| 5,501,781 | A | 3/1996 | Hsu et al. |
| 5,693,201 | A | 12/1997 | Hsu et al. |
| 5,976,332 | A | 11/1999 | Hsu et al. |
| 6,001,258 | A | 12/1999 | Sluys et al. |
| 6,143,185 | A | 11/2000 | Tracy et al. |
| 6,296,957 | B1 | 10/2001 | Graage |
| 6,316,134 | B1 | 11/2001 | Cownden et al. |
| 6,376,113 | B1 | 4/2002 | Edlund et al. |
| 6,450,447 | B1 | 9/2002 | Konrad et al. |
| 6,623,880 | B1 | 9/2003 | Geisbrecht et al. |
| 6,854,688 | B2 * | 2/2005 | McElroy et al. ............ 244/53 R |
| 6,916,564 | B2 | 7/2005 | Clawson et al. |
| 6,921,595 | B2 | 7/2005 | Clawson et al. |
| 6,924,053 | B2 | 8/2005 | McElroy |
| 7,036,314 | B2 | 5/2006 | Hoffjann et al. |
| 7,108,229 | B2 * | 9/2006 | Hoffjann et al. ......... 244/172.2 |
| 7,208,239 | B2 | 4/2007 | Hoffjann et al. |
| 2002/0004152 | A1 | 1/2002 | Clawson et al. |
| 2002/0142198 | A1 | 10/2002 | Towler et al. |
| 2004/0040312 | A1 | 3/2004 | Hoffjann et al. |

FOREIGN PATENT DOCUMENTS

| | | |
|---|---|---|
| DE | 43 23 719 | 1/1995 |
| DE | 102 16 710 | 4/2003 |
| EP | 0 400 701 | 12/1990 |
| EP | 0 634 563 | 1/1995 |
| EP | 0 957 026 | 11/1999 |
| EP | 0 964 466 | 12/1999 |
| EP | 0 967 676 | 12/1999 |
| GB | 2 338 750 | 12/1999 |
| JP | 4-159423 | 6/1992 |
| JP | 11-200888 | 7/1999 |
| JP | 2000-311698 | 11/2000 |
| JP | 2001-167781 | 6/2001 |
| WO | WO 99/35702 | 7/1999 |

OTHER PUBLICATIONS

German Office Action in German Application 102 49 588.2-22, mailed Jun. 30, 2003, 4 pages, German Patent and Trademark Office, Muenchen, Germany, with partial English tranlation.

Japanese Office Action in Japanese Application 2004-547406, mailed May 12, 2009, 6 pages, Japanese Patent Office, with partial English translation.

* cited by examiner

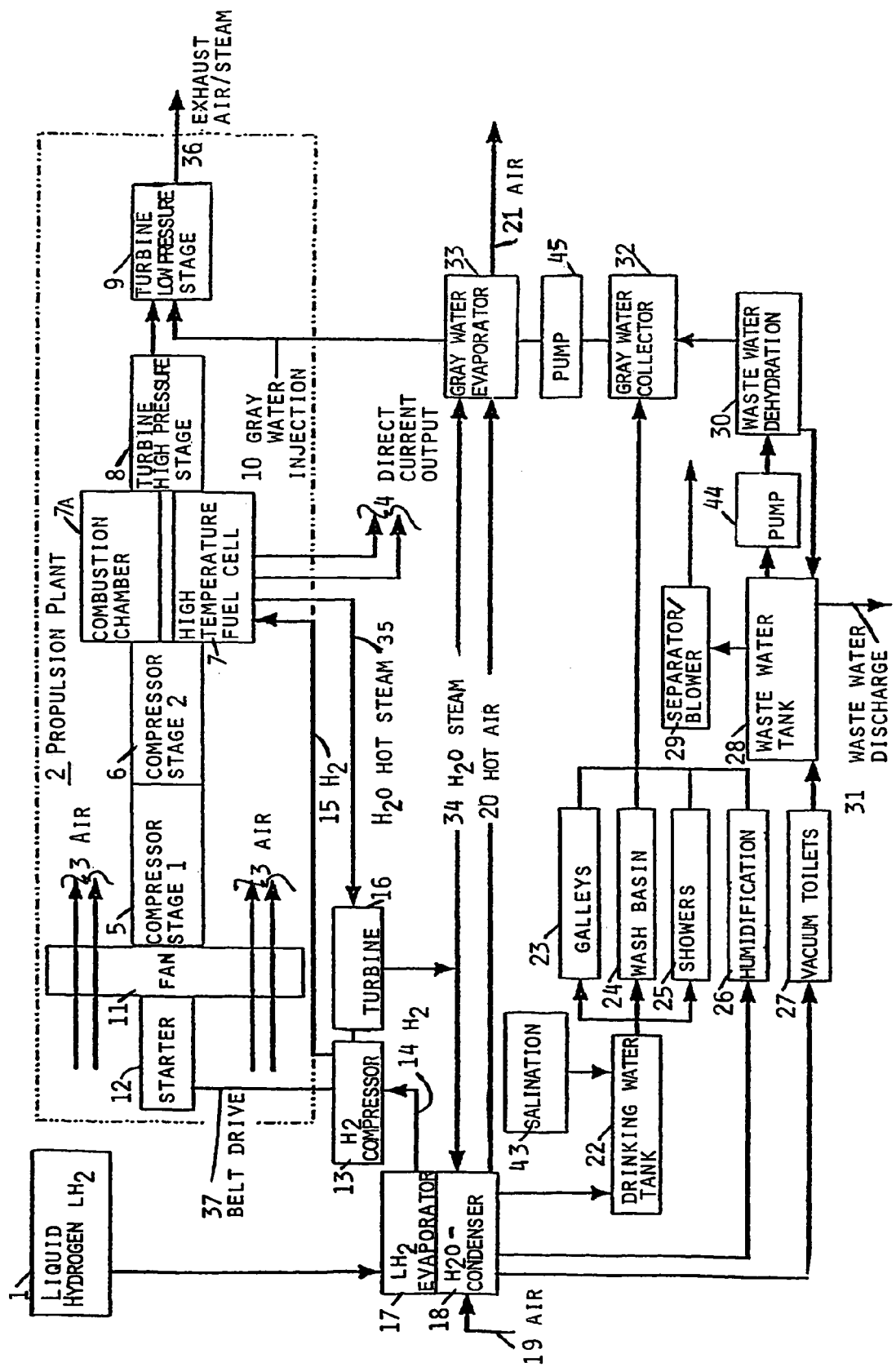

DEVICE FOR PRODUCING WATER ON BOARD OF AN AIRPLANE

FIELD OF THE INVENTION

The invention relates to an apparatus for producing water on board of an aircraft while using one or more fuel cells, wherein a partial or complete integration of a water production unit in the form of one or more high temperature fuel cells into an aircraft engine is provided in such a manner that the combustion chambers of the aircraft engine are replaced completely or partially by the high temperature fuel cells and thus either supplementing or completely replacing the process that takes place in the conventional type combustion chambers.

BACKGROUND INFORMATION

European Patent Publication EP 957,026 A2 discloses an energy supply unit on board of an aircraft for substituting a main propulsion plant, an auxiliary power unit, a ram air turbine or a nickel cadmium (NiCd) battery. A fuel cell serves for producing d.c. current whereby exhaust air of the aircraft air-conditioning plant or external air of the aircraft are used as air supply for the fuel cell. Water is recovered from the fuel cell exhaust air for the water supply of the aircraft. Subsequently the fuel cell exhaust air is discharged to the aircraft surroundings. This also applies to the hydrogen emanating from the fuel cell. A water production is performed by a condenser arranged in the aircraft outlet.

European Patent Publication EP 967,676 A1 describes a jet engine having fuel cells integrated into the combustion chambers, wherein the fuel cells are arranged on the combustion chambers, contrary to the teaching of the new main claim as seen from the enclosure, wherein the combustion chambers are partially or completely replaced by the high temperature fuel cell or cells. In the prior, known propulsion plant the process of the propulsion plant is merely used for the operation of the fuel cell.

SUMMARY OF THE INVENTION

Thus, it is the object of the invention to provide an apparatus of the type mentioned above in which a fuel cells gas turbine combination is provided for the exclusive operation with hydrogen and air oxygen, as a propulsion plant and/or as auxiliary power unit for the water and pressurized air supply of the cabin and for current generation.

This object has been achieved according to the invention in that the high temperature fuel cells are constructed as the type: solid oxide fuel cell (SOFC) or molten carbonate fuel cell (MCFC), or are of a type comparable in power and temperature level; that pure hydrogen is supplied to the anode side of said high temperature fuel cells, that air is supplied to the cathode side of the high temperature fuel cells, that a mixture of hydrogen and air is supplied to the combustion chambers, that at least the hydrogen supply is constructed for a closed loop control or can be shut off completely, and that a single stage or multistage turbine is connected downstream of the anode side of the high temperature fuel cell, said turbine converting the thermal energy of the anode exhaust gas into rotation energy.

Embodiments of the invention are described in the dependent claims 2 to 24.

It is provided to thereby replace at least one, preferably however, several combustion chambers by one or more high temperature fuel cells. In distinction to the mentioned subject matter at least one or more combustion chambers are retained for combusting a hydrogen water mixture. The combustion chambers and the high temperature fuel cells are preferably arranged in alternating succession as a ring shape around the shaft or shafts of the gas turbine.

The combustion chambers serve for starting the gas turbine and the high temperature fuel cells and for temporarily increasing the air throughput of the gas turbine e.g. for the start of an aircraft. During continuous operation, exclusively the thermal energy of the high temperature fuel cell is used for generating the air throughput. The water generation takes place at the anode side i.e. at the hydrogen side of the high temperature fuel cell. This so called anode exhaust gas consists of 100% water steam (superheated steam) when the supplied hydrogen is completely transformed. This superheated steam is fed through a turbine where the steam is cooled by expansion whereby thermal energy is converted into rotation energy of the turbine shaft. This rotational energy is used in a compressor for generating the pre-pressure that is required at the hydrogen side for the high temperature fuel cell.

The water vapor is eventually condensed out in a further process stage to obtain pure $H_2O$, that is, distilled water. This water is supplied to the different consumers or to a salination unit to produce drinking water. Gray water becoming available is collected in a collecting container in the same way as the water proportion discharged when dehydrating black water. The water quantities are evaporated in an evaporator operated by the heat available from the water condensation process and supplied together with the steam proportion from the anode exhaust gas of the high temperature fuel cell, not needed for water generation, to the second turbine stage of the gas turbine. On the air side a so-called fan sucks-in external air and/or cabin exhaust air. During normal operation this fan is driven by the second turbine stage, during starting by an electric motor. The air passing through the fan is first compressed by a compressor arranged downstream, and is then further compressed in a further compressor for the combustion chambers and for the air side of the high temperature fuel cell. The thermal energy introduced through the combustion chambers or the high temperature fuel cell first drives the first turbine stage and, following the above described introduction of gray water into the hot exhaust air flow, the second turbine stage. The number of the compressor and turbine stages, as well as the number of the combustion chambers and of the high temperature fuel cells can be varied as desired depending on the requirements with regard to different types.

The advantages of the apparatus according to the invention reside in the following:

a) flexibility with regard to short duration power demands,
b) high integration of the individual process steps,
c) high purity of the generated water,
d) high system efficiency and
e) a weight reduction.

BRIEF DESCRIPTION OF THE DRAWING

The invention will be described in connection with an example embodiment, with reference to the accompanying drawing, of which the single figure schematically shows a block diagram of the example embodiment of an inventive apparatus for producing water on board an aircraft.

DETAILED DESCRIPTION OF AN EXAMPLE EMBODIMENT OF THE INVENTION

The drawing illustrates an example embodiment according to the invention.

The single FIGURE shows a water generation system including a tank for liquid hydrogen.

Thus, a use in a so-called "cryoplane" is particularly advantageous. As can be seen in the drawing, a high temperature fuel cell 7 replaces partially a combustion chamber 7A of an aircraft propulsion plant 2. Pure hydrogen is supplied to the anode side and air is supplied to the cathode side of the high temperature fuel cell 7, while a mixture of hydrogen and air is supplied to the combustion chamber 7A, whereby at least the hydrogen supply is constructed to be controllable in closed loop fashion or to be completely shut-off. A single stage or multistage turbine 16 is connected downstream to the anode side of the high temperature fuel cell 7. The turbine 16 converts the thermal energy of the anode exhaust gas 35 into rotation energy. Fuel cells of the type solid oxide fuel cell (SOFC) or molten carbonate fuel cell (MCFC) or of a type comparable with regard to power and temperature may be used.

A condensation process 18 is connected downstream of the high temperature fuel cell 7. The process 18 condenses water out of a portion of the anode exhaust gas 35 of the fuel cell 7. Further, the high temperature fuel cell 7 may be pressurized on both sides, on the one hand, on the air or oxygen side and on the fuel or hydrogen side, on the other hand, whereby equal or even unequal pressures are permissible on the anode side and on the cathode side. Using liquid or gaseous hydrogen is possible. Liquid hydrogen 1 can be evaporated prior to entering the high temperature fuel cell 7 or the combustion chamber 7A, whereby the evaporator 17 may be operated with the process heat of the anode exhaust gas condenser 18. A special embodiment of the apparatus according to the invention is characterized in that the evaporator 17 is arranged in a ring shape around the condenser 18 or circularly inside the condenser 18 whereby the evaporator is constructed as a pipe bundle heat exchanger. In this case also at least a portion of the condensation process 18 can be operated with cooling air 19.

It is possible to collect used water as well as not needed condensate in a container 32. The air 20 that was heated in the condensation process 18 is advantageously used for evaporating the gray water in a separate container 33 into which the gray water is fed by a pump 45, whereby a filter is provided for retaining solid and suspended materials. Water having a distilled quality is taken from the condensation process 18 via a drinking water tank 22, and is distributed in such a manner that galleys 23, hand wash basins 24 and the showers 25 receive drinking water that has been generated by adding a dose of salt in a salination unit 43, while toilets 27 and the air humidification 26 are supplied with distilled water. The turbine stages 8, 9 can drive the compressor stages 5, 6 as well as the fan 11, whereby the compressor stages 5, 6 pressurize the air side of the high temperature fuel cell 7 and of the combustion chamber 7A. The air throughput 3 of the fan 11 can be used either for propulsion in an engine or in an APU for pressurizing the compressed air systems and/or of the air conditioning. For this purpose respectively one fan 11 is coupled with a first compressor stage 5 and a second turbine stage 9, and a second compressor stage 6 and a first turbine stage 8, that that run on coaxial shafts one within the other and at different revolutions per minute. The number of coaxial shafts running one within the other is constructed as desired.

The waste water is collected in a collection tank 28, which has a separator/blower 29 connected to an outlet thereof, and the waste water is then completely or partially dehydrated in a dehydration unit 30 connected to an outlet of the tank 28 through a pump 44. The water proportion thus gained is fed to the gray water collection tank 32 from which it is pumped by a pump 45 to the gray water evaporator 33. Waste water is discharged at 31 from the tank 28. It is of special advantage:

that the apparatus can also be operated without dispensing water to a water system, that the combustion chambers and the high temperature fuel cells can be operated separately and in any desired combination with one another; and that in a separate operation of combustion chambers or high temperature fuel cells 7 individual combustion chambers or high temperature fuel cells can be switched off.

Further as shown in the single drawing figure, the inventive apparatus may additionally have the following features. The high temperature fuel cell 7 can provide a direct current output 4. An output of the gray water evaporator 33 can provide a gray water injection 10 into the low pressure turbine stage 9. Air 21 can also be output from the gray water evaporator 33. The turbine 16 can drive a hydrogen compressor 13 that provides a flow of compressed hydrogen 15 to the fuel cell 7, and can be coupled via a belt drive 37 with a starter 12 that is coupled to the fan 11 for starting the propulsion plant 2. Hydrogen 14 can be provided to the hydrogen compressor 13 from the hydrogen evaporator 17. Water steam 34 from the turbine 16 can be fed to the condenser 18 and the gray water evaporator 33. Exhaust air or steam 36 can be emitted from the low pressure turbine stage 9.

The invention claimed is:

1. An apparatus for producing water on board of an aircraft while using one or more fuel cells, comprising at least one high temperature fuel cell that has an anode side and a cathode side and that is integrated into a heat-producing arrangement of an aircraft engine, wherein the heat-producing arrangement optionally additionally includes at least one combustion chamber, wherein the high temperature fuel cell is adapted to carry out a fuel cell process and the optional combustion chamber is adapted to carry out a combustion process, characterized in that:

the high temperature fuel cell is an oxide ceramic fuel cell (SOFC - solid oxide fuel cell), or a molten carbonate fuel cell (MCFC), or a fuel cell that has a power and temperature level equivalent to an oxide ceramic fuel cell or a molten carbonate fuel cell;

the apparatus includes a hydrogen supply that comprises a source of liquid or gaseous hydrogen and that is arranged and adapted to supply pure hydrogen to the anode side of said high temperature fuel cell;

an air intake is arranged and adapted to supply air to the cathode side of said high temperature fuel cell;

the hydrogen supply and the air intake are further arranged and adapted to supply a mixture of hydrogen and air to the combustion chamber;

at least the hydrogen supply is constructed for a closed loop control or can be shut off completely;

the apparatus further includes a liquid hydrogen evaporator positioned upstream of the high temperature fuel cell or the combustion chamber; and the apparatus further includes a single stage or multistage turbine (16) connected downstream of the anode side of the high temperature fuel cell, said turbine adapted to convert thermal energy of anode exhaust gas (35) into rotation energy.

2. The apparatus of claim 1, characterized in that the conversion of the thermal energy takes place by a Stirling motor and/or by one or more combinations of different thermal engines, for example a turbine and a Stirling motor.

3. The apparatus of claim 1, comprising a compressor (13) and means for supplying gained mechanical energy to said compressor.

4. The apparatus of claim 3, wherein said compressor is used for charging said anode side of said high temperature fuel cell (7) with hydrogen (15) under pressure.

5. The apparatus of claim 1, further comprising a condensation process (18) connected downstream of said high temperature fuel cell or high temperature fuel cells (7), said condensation process condensing water out of a portion of anode exhaust gas (35) of said fuel cell (7).

6. The apparatus of claim 1, wherein said high temperature fuel cell is constructed for pressurizing the air or oxygen side, and the fuel or hydrogen side, whereby equal or different pressures are permissible on the anode side and on the cathode side.

7. The apparatus of claim 1, further comprising an anode exhaust gas condenser (18) and wherein said evaporator (17) is constructed to be operable by process heat of said anode exhaust gas condenser (18).

8. The apparatus of claim 7, wherein said evaporator (17) is constructed as a pipe bundle heat exchanger which is arranged as a ring shape around said condenser (18) or circularly within said condenser (18).

9. The apparatus of claim 7, wherein at least a portion of said condenser (18) is operable with cooling air (19).

10. The apparatus of claim 1, wherein produced steam is blown in upstream of a second turbine stage (9) of said multistage turbine where said steam is mixed with cathode exhaust air.

11. The apparatus of claim 5, further comprising means for withdrawing water of distilled quality from the condensation process (18) and for distributing said distilled quality water, a salination station (43) for adding a dose of salt to produce drinking water for galleys, hand wash basins and showers and for supplying distilled water to toilets and humidifiers.

12. The apparatus of claim 1, wherein said multistage turbine comprises turbine stages (8, 9) for driving compressor stages (5, 6) and a fan (11), and wherein the compressor stages (5, 6) pressurize an air side of said high temperature fuel cell (7) and of said combustion chamber (7A).

13. The apparatus of claim 12, wherein an air throughput (3) of said fan (11) is used either in an engine for propulsion or in an APU for pressurization of pressurized air systems and/or of an air conditioning system.

14. The apparatus of claim 12, wherein said fan (11) is coupled with a first compressor stage (6) and with the second turbine stage (9), and wherein a second compressor stage (6) and the first turbine stage (8) are coupled with each other and run on coaxial shafts with different revolutions per minutes.

15. The apparatus of claim 14, wherein the number of coupled compressor stages and turbine stages, the direction of rotation of these stages, and the number of coaxial shafts rotating one within the other are constructed at discretion.

16. The apparatus of claim 1, constructed for being operable without supplying water to a water system.

17. The apparatus of claim 1, wherein said at least one combustion chamber and said at least one high temperature fuel cell are operable separately and in any desired combination.

18. The apparatus of claim 1, wherein individual combustion chambers or high temperature fuel cells are adapted to be switched off for a separate operation of combustion chambers or high temperature fuel cells.

19. An apparatus for producing water on board of an aircraft while using one or more fuel cells, comprising at least one high temperature fuel cell that has an anode side and a cathode side and that is integrated into a heat-producing arrangement of an aircraft engine, wherein the heat-producing arrangement optionally additionally includes at least one combustion chamber, wherein the high temperature fuel cell is adapted to carry out a fuel cell process and the optional combustion chamber is adapted to carry out a combustion process, characterized in that:
   the high temperature fuel cell is an oxide ceramic fuel cell (SOFC - solid oxide fuel cell), or a molten carbonate fuel cell (MCFC), or a fuel cell that has a power and temperature level equivalent to an oxide ceramic fuel cell or a molten carbonate fuel cell;
   the apparatus includes a hydrogen supply that is arranged and adapted to supply pure hydrogen to the anode side of said high temperature fuel cell;
   an air intake is arranged and adapted to supply air to the cathode side of said high temperature fuel cell;
   the hydrogen supply and the air intake are further arranged and adapted to supply a mixture of hydrogen and air to the combustion chamber;
   at least the hydrogen supply is constructed for a closed loop control or can be shut off completely;
   the apparatus further includes a single stage or multistage turbine (16) connected downstream of the anode side of the high temperature fuel cell, said turbine adapted to convert thermal energy of anode exhaust gas (35) into rotation energy; and
   the apparatus further includes a gray water evaporator (33) arranged and adapted so that air (20) heated in a condensation process is used for evaporating gray water in said gray water evaporator, a pump (45) arranged for feeding said gray water into said gray water evaporator (33), and a filter arranged for retaining solid and suspended matter out of said gray water.

20. The apparatus of claim 19, further comprising a gray water collection tank (32) for collecting used water and unneeded condensate as the gray water.

21. The apparatus of claim 20, further comprising a waste water collection tank (28) adapted to collect waste water, and a dehydrator (30) adapted to completely or partially dehydrate said waste water and a thus-gained water portion is fed into the gray water collection tank (32).

22. The apparatus of claim 19, wherein any germs and microorganisms present in the gray water (32) are thermally killed.

* * * * *